United States Patent [19]
Sokalski et al.

[11] Patent Number: 5,709,285
[45] Date of Patent: Jan. 20, 1998

[54] BRAKE FOR A HOISTING APPARATUS

[75] Inventors: Marek Sokalski; Erik Zachariassen, both of Kristiansand, Norway

[73] Assignee: Maritime Hydraulics AS, Kristiansand, Norway

[21] Appl. No.: 538,218

[22] Filed: Oct. 3, 1995

[30] Foreign Application Priority Data

Oct. 5, 1994 [NO] Norway ..................................... 943731

[51] Int. Cl.⁶ ................. F16D 65/14; B66D 5/02
[52] U.S. Cl. ................... 188/106 F; 188/71.6; 254/377; 254/379
[58] Field of Search ................... 188/71.5, 71.6, 188/106 F, 106 P, 796, 170, 264 E, 264 P, 180; 303/3, 15; 254/267, 321, 322, 367, 377, 378, 379

[56] References Cited

U.S. PATENT DOCUMENTS

| 1,746,371 | 2/1930 | Turnbull et al. | |
| 1,992,911 | 2/1935 | De La Mater. | |
| 1,992,912 | 2/1935 | De La Mater. | |
| 2,883,013 | 4/1959 | Keith et al. | 254/378 X |
| 4,043,434 | 8/1977 | Braschler | 188/296 |
| 4,207,969 | 6/1980 | Howell | 188/71.6 |
| 4,324,387 | 4/1982 | Steinhagen | 188/180 X |
| 4,875,530 | 10/1989 | Frink et al. | 254/377 X |

FOREIGN PATENT DOCUMENTS

| 3809646 | 10/1989 | Germany. |
| 1344-733-A | 10/1987 | U.S.S.R.. |
| WO 95/08069 | 3/1995 | WIPO. |

*Primary Examiner*—Peter M. Poon
*Attorney, Agent, or Firm*—Cushman Darby & Cushman Intellectual Property Group of Pillsbury Madison & Sutro LLP

[57] ABSTRACT

A brake for a hoisting apparatus including a hoisting line, a drum for the hoisting line, a hoisting motor and a brake system for braking of the hoisting cable, the brake system consisting of a hydraulic brake and a mechanical brake. The mechanical and the hydraulic brakes are connected to a common transmission which is driven by the drum when this rotates freely, and the mechanical and the hydraulic brakes are controlled by a common controller for controlling the distribution of braking power between the two brakes. The control system distributes the braking power automatically between the brake systems. The transmission can also be connected to an autodriller for controlling the weight on the bit.

7 Claims, 4 Drawing Sheets

BRAKE FOR A HOISTING APPARATUS

BACKGROUND OF THE INVENTION

The present invention relates to a brake for a hoisting apparatus.

Recently, more and more attention has been focused on cost reductions by means of increased drilling efficiency. Although a drilling operation consists of many tasks of varying importance, it is obvious that any task that can be accelerated in one way or another will improve the productivity of the rig and thereby reduce operating costs or increase the market value of the rig. Drilling efficiency is one of the most important factors when measuring rig productivity.

One of the most important areas here is the hoisting apparatus of the rig. This is crucial for adjusting the weight on the bit. The rotary speed of the drill string and the weight on the bit are the major factors influencing the drilling rate. Accurate control of the weight on the bit is therefore of utmost importance. In order to obtain an accurate control of the lowering of the bit and the weight on the bit there is used a hoisting apparatus adapted for raising and lowering the drill string.

Accurate control of the weight on the bit requires a brake system which can regulate the lowering of the bit. A conventional hoisting apparatus comprises at least one mechanical brake system which is manually controlled. In addition, the hoisting apparatus can also be equipped with a hydraulic brake or an electrical brake, usually of the induction brake type (eddy current brake), in order to relieve the mechanical brake at high cable speed. U.S. Pat. No. 2,159,250 and U.S. Pat. No. 2,563,089 show examples of such hoisting apparatuses having two independent brakes.

Since the mechanical brake of such a conventional hoisting apparatus is manually controlled, the efficiency of the drill rig depends largely on the skill of the operator. The operator must be attentive at all times, and he or she must have a well developed "fingertip feeling" in order to be able to determine how hard he or she shall pull the brake lever. He must also, in those cases where the hoisting apparatus is provided with both a mechanical brake and a hydraulic brake or other additional brake, determine the extent to which he or she shall utilize the hydraulic brake or the mechanical brake. The hydraulic brake is primarily used in the lowering of the drill string, for the purpose of reducing its speed down to a certain level. In order to arrest the drill string or decrease its velocity to a level below what can be attained by the maximum braking action of the hydraulic brake, the operator uses the mechanical brake. If he or she makes a wrong estimate in the lowering of the drill string and connects the mechanical brake too late, the drill string might be driven with great force down into the bottom of the bore hole. The serious consequences this will have for the operation of the drill rig can easily be imagined.

SUMMARY OF THE INVENTION

In order to avoid these disadvantages and provide a brake system allowing a more accurate control of the braking of the hoisting cable and thus a more accurate control of the lowering of the drill string, as well as, in a further development of the invention, a more accurate control of the weight on the bit, the present invention provides a brake system comprising a dynamic brake.

With the system according to the present invention, the operator is able to regulate the whole braking action by means of a single lever, connected to the brake system via a control unit. He or she does not need to consider whether he or she shall use the hydraulic brake or the mechanical brake. The control system takes care of automatically distributing braking power between the two systems. Nor does the operator need to be located outside by the hoisting apparatus as before, but can sit comfortably in a control cabin, with a view of the hoisting apparatus for visual control. The data relating to velocity, weight on the hoisting apparatus and other parameters he or she can read on a computer screen.

The dynamic brake can in a simple manner be installed in an already existing hoisting apparatus having a mechanical brake and possibly a hydraulic brake or an induction brake. The hydraulic brake or induction brake is removed, and the dynamic brake is mounted on the drum shaft where the previous brake was placed. The mechanical brake may be retained as an emergency brake, its removal being unnecessary for achieving the desired effect, but it will normally not be used since the dynamic brake possesses sufficient braking effect to stop the drum also in an emergency.

The hydraulic brake can also be provided with a so-called autodriller. This consists of, inter alia, a hydraulic motor adapted to wind and unwind the hoisting cable by small rotations of the drum in one direction or the other. The autodriller is used to control the weight on the bit. The other parts of the brake system are disconnected when the autodriller is in operation. The autodriller is automatically regulated by a separate control system or, preferably, by the same control system that regulates the dynamic brake, in accordance with the weight of the drill string or other parameters of importance in order to attain the desired weight on the drill string.

BRIEF DESCRIPTION OF THE DRAWINGS

The invention shall now be described in more detail, with reference to the appended drawings, wherein.

DETAILED DESCRIPTION

Figure 1:
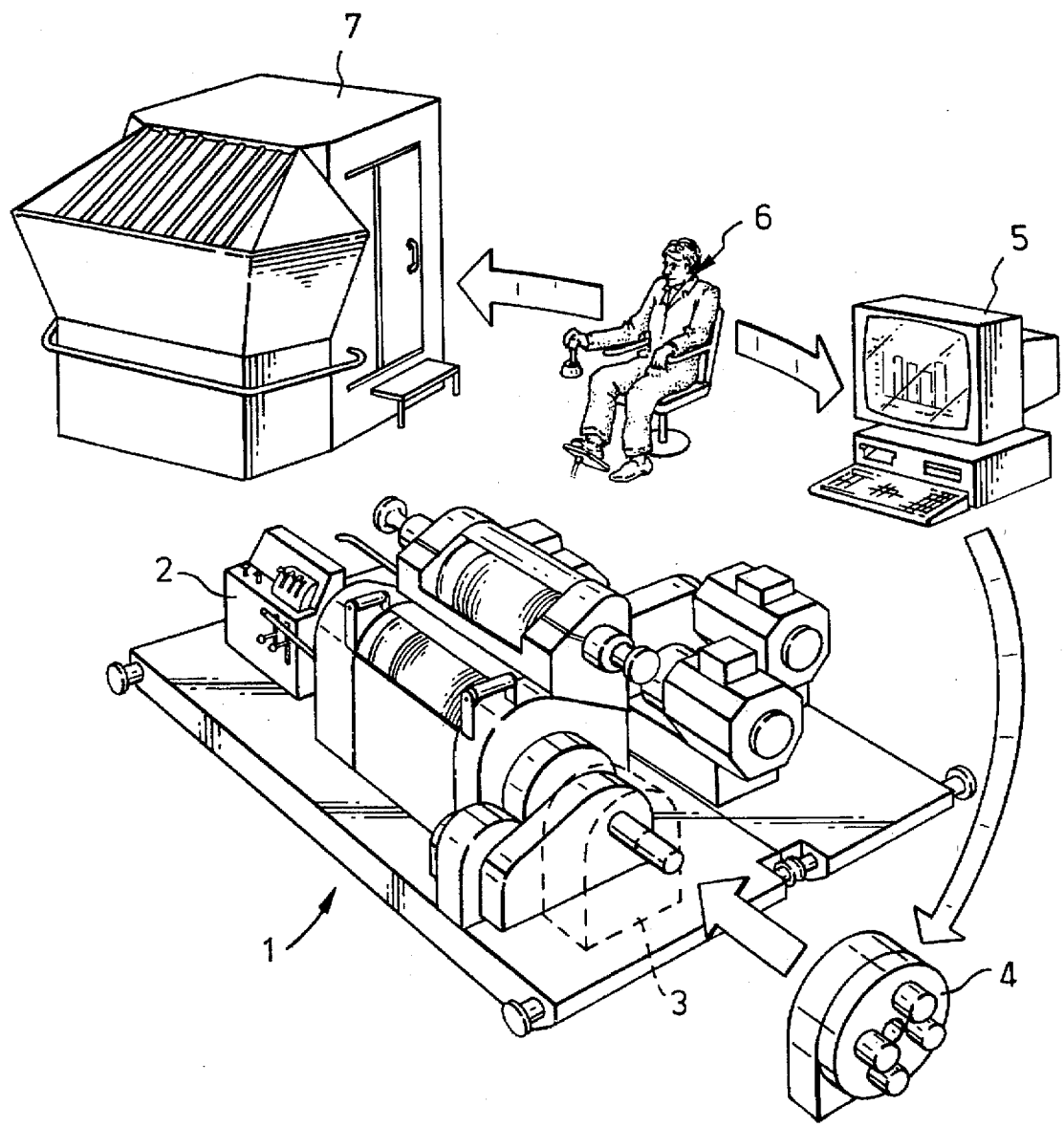
FIG. 1 shows schematically how the dynamic brake is mounted on a conventional hoisting apparatus and illustrates also how the operator regulates the braking operation via the control system.
Figure 2:
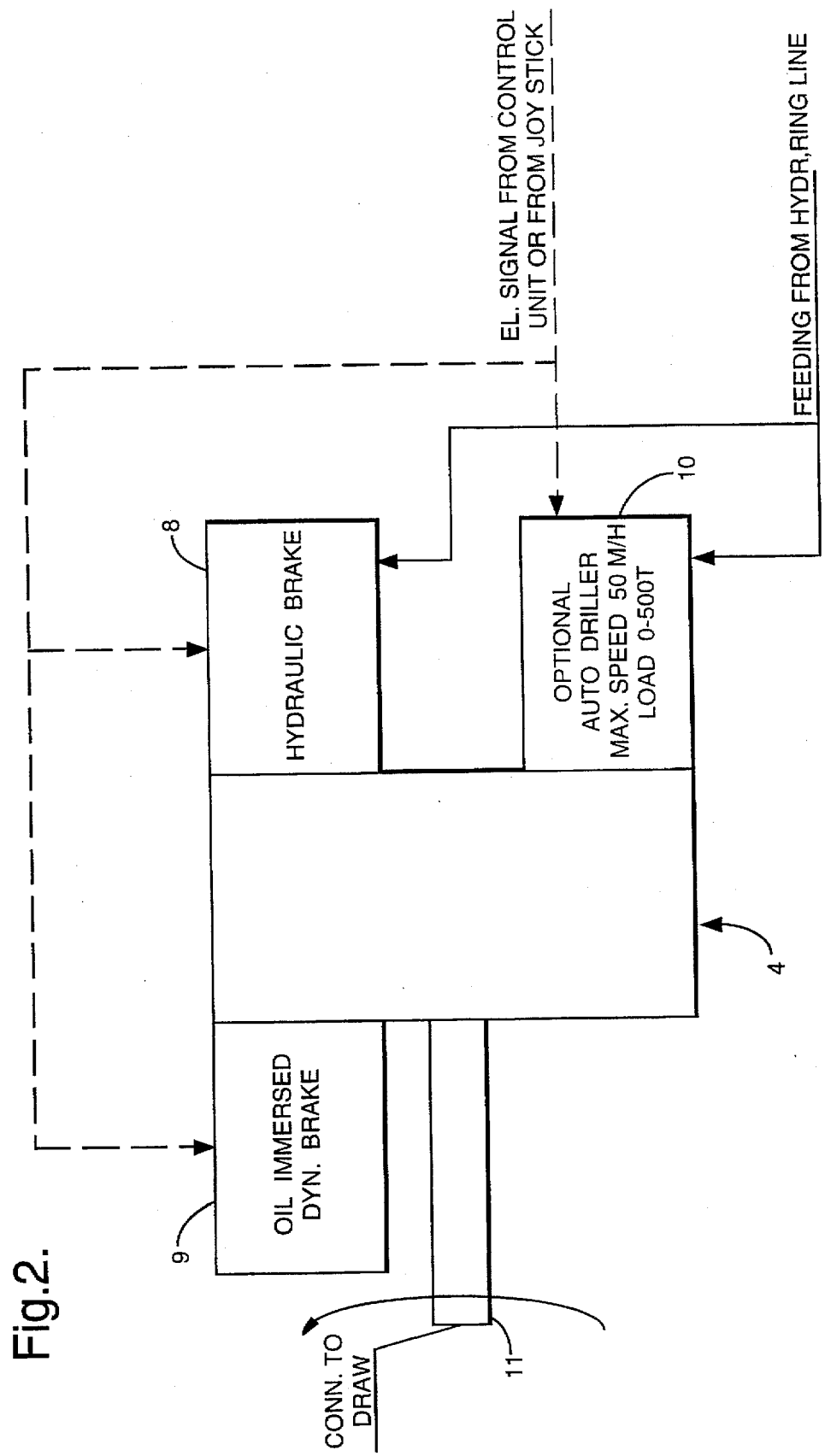
FIG. 2 shows schematically how the dynamic brake is constructed with a mechanical brake and a hydraulic brake, as well as an optional autodriller.

In FIG. 1 there is shown a hoisting apparatus of conventional type, provided with a control console 2 for an operator controlling the braking action of the hoisting apparatus. The conventional hoisting apparatus 1 is equipped with an induction brake 3 (indicated by dotted lines) which is used together with a mechanical brake for controlling the lowering action of the hoisting apparatus. As seen from the drawing, the operating console 2 comprises a plurality of operating means for controlling the hoisting apparatus. According to the invention, the induction brake 3 is replaced by a dynamic brake system 4 which is operated via a control unit 5 by an operator 6 who is preferably located in a cabin 7 with a view of the hoisting apparatus 1. As apparent from FIG. 2, the hydraulic brake 4 consists of a hydraulic brake 8 and a mechanical brake 9. The unit 4 also comprises an autodriller 10 for automatic adjustment of the weight on the bit and precision control of the raising and lowering action. From the dynamic brake there extends a shaft 11, connected to the hoisting drum.

The operator 6 can in a simple way control both the releasing and retracting of the hoisting cable by the use of operating means, for example a so-called "Joy-stick," which can be coupled both to the braking function of the hoisting apparatus and to the motor which retracts the hoisting cable, so that actuating the operating means in one direction effects a controlled lowering, and actuating the means in the other direction effects a lifting movement.

Figure 3:
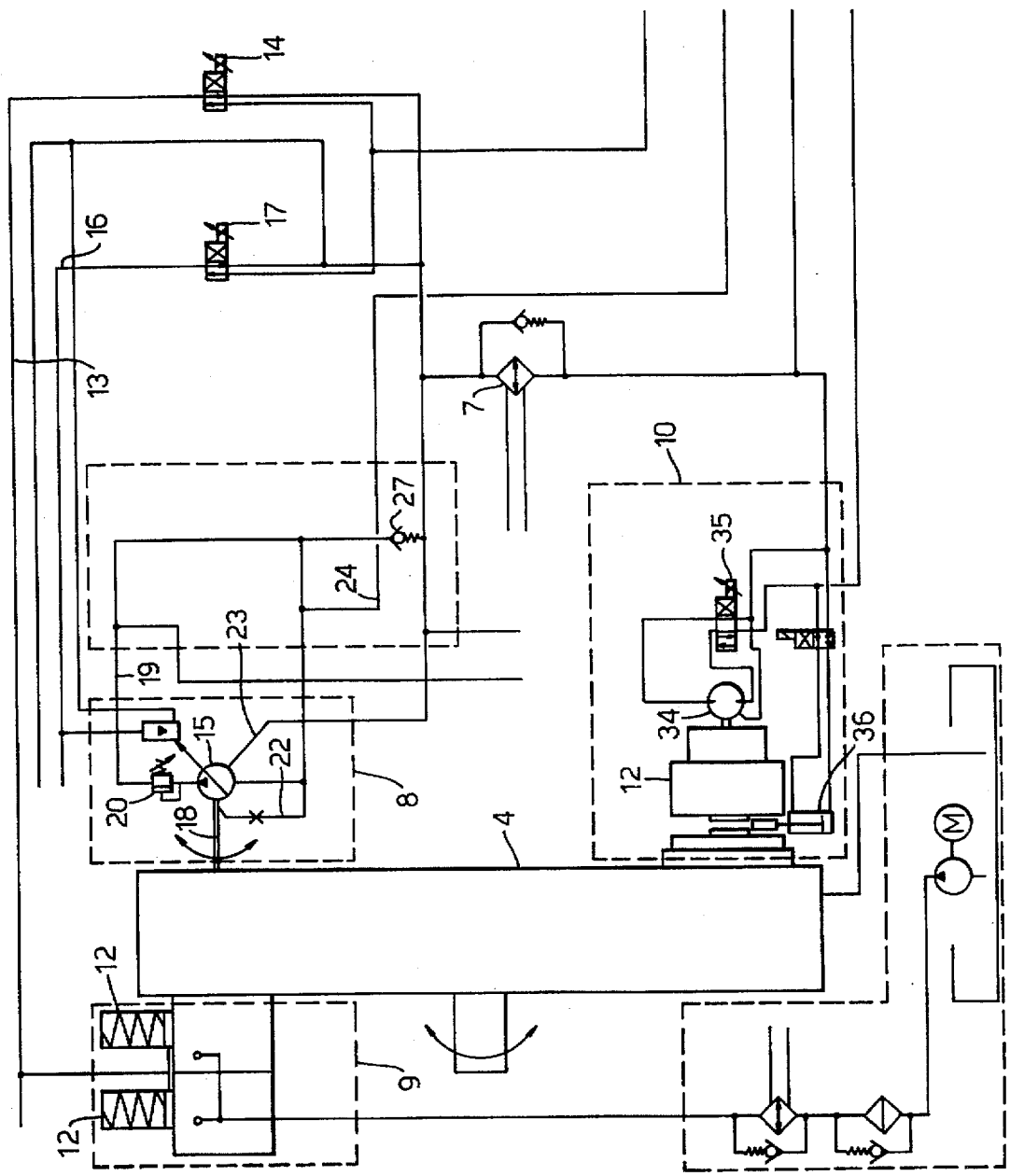
FIG. 3 shows an embodiment of the hydraulic system for controlling the brake systems.

In FIG. 3, the hydraulic system of the brake is shown. The mechanical brake 9, which is preferably a multi-plate brake, is prestressed by means of springs 12 for an on-position, so that the brake is automatically actuated if the hydraulic pressure disappears. In order to keep the brake in an off-position, hydraulic pressure is introduced from a feed line 13 through a two-way control valve 14 supplied from the existing main hydraulic system. The mechanical brake is cooled with oil.

The hydraulic brake consists of a hydraulic pump 15 which also is supplied from the existing main hydraulic system via a line 16 through a two-way control valve 17. The hydraulic pressure applied via line 16 regulates the displacement of the hydraulic pump 15. The greater pressure that is supplied via line 16, the greater displacement the pump achieves and the greater the braking effect becomes. When the hydraulic pump 15 is driven in rotation by the unwinding drum via shaft 18, it pumps oil around in the ring line 19. A pressure-controlled valve 20 which provides a counter pressure on the pressure side of the pump is mounted in the ring line 19.

The bearings of the pump 15 are provided with lubricant via a throttled line 22. Warm oil, heated because of the high pressure from the braking action, is continuously discharged from the pump and ring line 19 via a discharge line 23 and a prestressed check valve leading back to the return line. In order to replace the discharged oil, the ring line 19 is continuously supplied with oil from the pressure side of the hydraulic system via a line 24 having an excess pressure of about 10 bar. The two control valves 14 and 17 are operated via the control system 5, providing automatic regulation of the braking effect of the two brake systems.

The autodriller 10 consists of a motor 34 regulated via a three-way valve 35. The motor 34 is connected to the drum via a gear having a high gear ratio. When the drum is brought to a standstill after the lowering is completed and the drilling shall begin, the pump 34 is coupled to the drum by operating a coupling 36. The brakes 8 and 9 are then disconnected in that the pump 15 is positioned at zero displacement and the plates of the mechanical brake 9 are lifted out of the braking position. The motor 34 now drives the drill string up and down in small movements depending upon the weight on the drill bit. The motor 34 can be used for raising and lowering the drill string and for achieving accurate operation of the hoisting apparatus, for example in order to carry out a precision coupling.

Besides the components described, the system comprises all the other components which are necessary for any type of hydraulic system, such as hydraulic pumps for generating pressure in the system, return tank, filters, coolers, expansion tank, etc.

Figure 4:
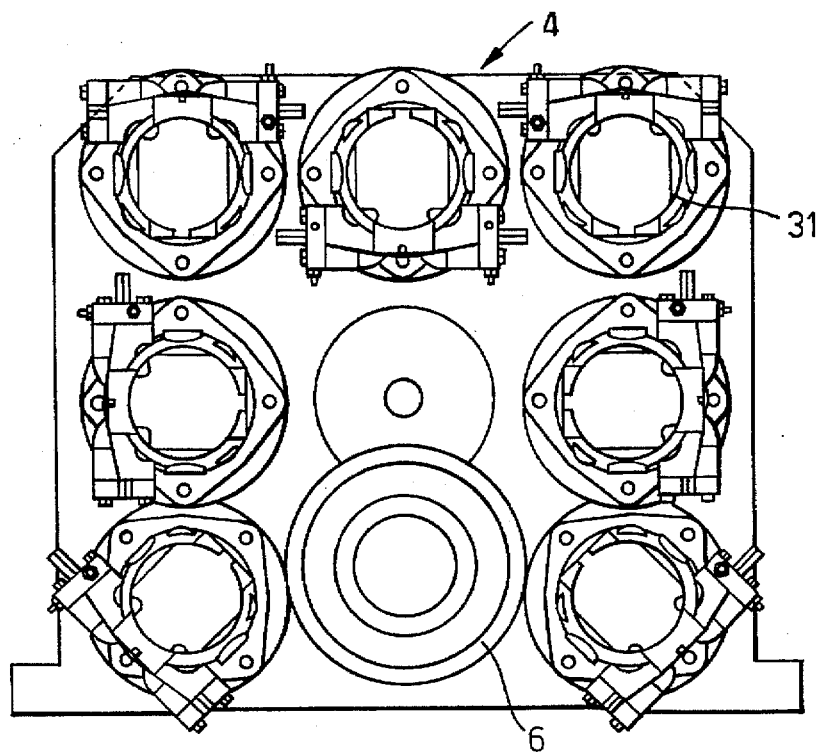
FIGS. 4 and 5 show the brake unit seen from two different sides.
Figure 5:
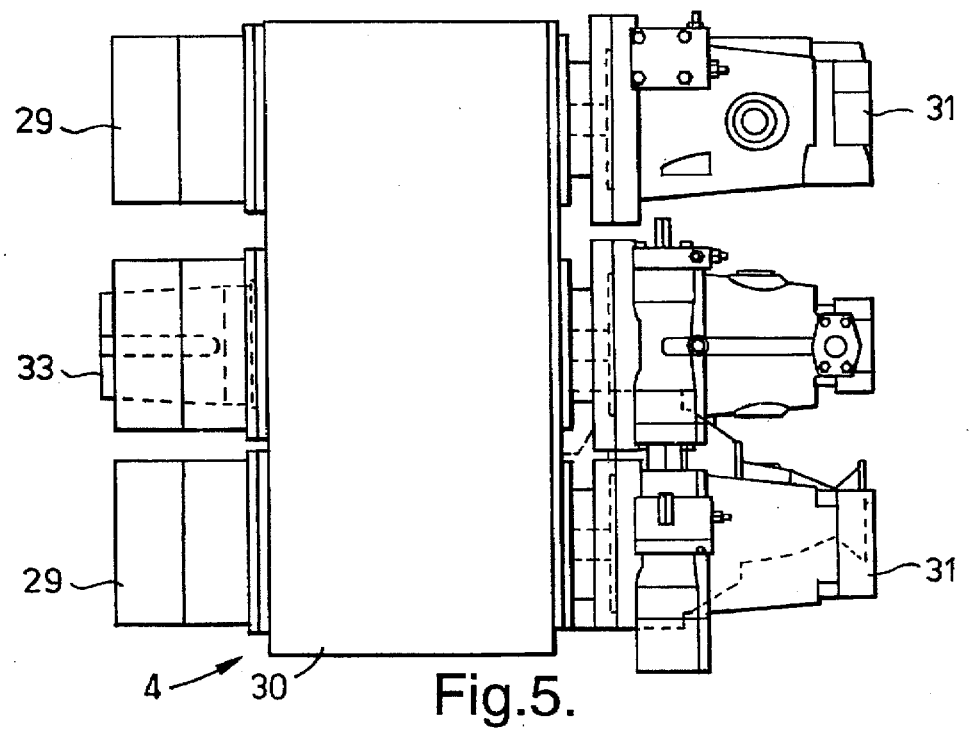

In FIGS. 4 and 5 the dynamic brake is shown as it appears in reality, with a number of mechanical friction brakes 29 positioned on one side of the transmission 30 and a number of hydraulic pumps 31 positioned on the other side of the transmission 30. A shaft 33 leads to the hoisting drum. The dynamic brake 4 can thus be mounted as a unit on the hoisting apparatus, possibly replacing a conventional induction brake.

The present invention provides a braking system constituting one unit that in a simple manner can be mounted on an existing hoisting apparatus. The braking system gives unique possibilities for controlling, in a simple manner, the lowering operation. In combination with an autodriller, the dynamic brake constitutes, together with an appropriate control system, a complete system for lowering the drill string and controlling the weight on the bit.

Although the invention is here described in connection with a drill rig, it is obvious that it can also be used in other connections where accurately controlled and safe lowering of a load is important.

Having described our invention, we claim:

1. A hoisting apparatus for use on a derrick, comprising:

a drum journalled for rotation;

a hoisting motor for reversibly rotating the drum in two directions at variable speeds;

a transmission operatively connecting said hoisting motor with said drum;

a dynamic brake apparatus including a hydraulic brake and a mechanical brake, said dynamic brake being operatively associated with said transmission for braking rotation of said drum;

a controller arranged for controlling distribution of braking power between said hydraulic brake and said mechanical brake;

an operator for operating said dynamic brake apparatus;

a transmission housing containing said transmission;

said mechanical brake including a plurality of mechanical brake units operatively connected to said transmission and being prestressed to a braking position;

said hydraulic brake including a plurality of hydraulic brake units operatively connected to said transmission;

said hydraulic brake units being high pressure hydraulic brake units having variable displacement, and being arranged to set themselves, in the absence of overriding hydraulic control pressure, to a position of greatest displacement;

an autodriller effectively coupled to said transmission and arranged for precision adjustment of rotational angular disposition of said drum in rotation, in both of said two directions;

said controller being arranged for causing said mechanical brake and said hydraulic brake to apply more and less braking power as a function of positioning of said operator; and said controller being further arranged to determine distribution of braking power applied by said mechanical brake and said hydraulic brake depending on input to said controller of information independent of positioning of said operator and including at least one of information as to weight acting on the hoisting apparatus, as speed of rotation of said drum.

2. The hoisting apparatus of claim 1 wherein:

said controller is arranged to apply relatively great braking power via said hydraulic brake and relatively small braking power via said mechanical brake, when said drum is rotating at a relatively high speed.

3. The hoisting apparatus of claim 1, wherein:

said controller is arranged to apply relatively great breaking power via said mechanical brake and relatively small braking power via said hydraulic brake, when said drum is rotating at a relatively low speed.

4. The hoisting apparatus of claim 3, wherein:

said controller is arranged to apply relatively great braking power via said hydraulic brake and relatively small braking power via said mechanical brake, when said drum is rotating at a relatively high speed.

5. The hoisting apparatus of claim 1, wherein:

said mechanical brake is an oil-filled multi-plate brake.

6. The hoisting apparatus of claim 1, further comprising:

a hydraulic fluid reservoir coupled to said hydraulic brake and including means for automatically exchanging hydraulic fluid, including hydraulic fluid line means for draining from said hydraulic brake to said reservoir hydraulic fluid which has become heated, and for replacing that heated hydraulic fluid with cooler hydraulic fluid.

7. The hoisting apparatus of claim 1, wherein:

said operator is arranged for temporarily causing both said mechanical brake and said hydraulic brake to provide zero braking effect when said autodriller is in use.

* * * * *